United States Patent [19]

Richardson et al.

[11] Patent Number: 5,734,346
[45] Date of Patent: Mar. 31, 1998

[54] METHOD OF AN APPARATUS FOR DETECTING THE DISPLACEMENT OF A TARGET

[75] Inventors: Alan Trevor Richardson, Cambridge; Gordon Kenneth Andrew Oswald, Cambridgeshire, both of United Kingdom

[73] Assignee: Cambridge Consultants Limited, Cambridge, England

[21] Appl. No.: 341,571

[22] PCT Filed: May 21, 1993

[86] PCT No.: PCT/GB93/01056

§ 371 Date: Nov. 22, 1994

§ 102(e) Date: Nov. 22, 1994

[87] PCT Pub. No.: WO93/24847

PCT Pub. Date: Dec. 9, 1993

[30] Foreign Application Priority Data

May 23, 1992 [GB] United Kingdom .................. 9211086

[51] Int. Cl.$^6$ .................................................. G01S 13/02
[52] U.S. Cl. .................. 342/124; 342/120; 342/123; 367/908; 73/290 V; 73/290 R
[58] Field of Search .................. 342/124, 123, 342/120; 367/908; 73/290 R, 291, 290 B, 290 V

[56] References Cited

U.S. PATENT DOCUMENTS

| | | | |
|---|---|---|---|
| 3,775,765 | 11/1973 | di Piazza et al. | 342/22 |
| 4,044,353 | 8/1977 | Levy | 342/124 |
| 4,320,659 | 3/1982 | Lynnworth et al. | 73/290 V |
| 4,847,623 | 7/1989 | Jean et al. | 342/124 |
| 5,181,039 | 1/1993 | Oswald et al. | 342/119 |
| 5,233,352 | 8/1993 | Cournane | 342/124 |

FOREIGN PATENT DOCUMENTS

| | | | |
|---|---|---|---|
| 0336025B1 | 12/1992 | European Pat. Off. | |
| 2594555 | 2/1986 | France | |
| 1100119 | 1/1968 | United Kingdom | |
| WO 8403942 | 10/1984 | WIPO | 342/124 |

OTHER PUBLICATIONS

Michiguchi et al, "Advanced Subsurface Radar System for Imaging Buried Pipes", IEEE Transactions on Geoscience and Remote sensing, vol. 26, Nov. 1988, New York, US, pp. 733–739.

Thurn, "Ultrasonic Detection Sensors for Sonar Bero Proximity Swiches", Siemens Energy & Automation, vol, 9, No. 2, Jul. 1989, Berlin DE, pp. 10–11.

Electronics, vol. 48, No. 17, 21 Aug. 1975, New York US, pp. 5E–6E "Microwave Radar Measures Precisely".

"Geophysical Radar Design" by G.K.A. Oswald, IEE Proceedings, vol. 135, Part F, No. 4, Aug. 1988.

"Introduction to Radar Systems" Second Edition 1981 by Skolnik, published by McGraw-Hill, pp. 420–434.

U.S. application Ser. No. 07/878,754, Oswald et al.

*Primary Examiner*—Ian J. Lobo
*Attorney, Agent, or Firm*—Nixon & Vanderhye P.C.

[57] ABSTRACT

A method of detecting the displacement of a target in a given environment includes storing reference data having data representative of the environment; transmitting a transmit signal towards the target; sensing the return signals from the target and the environment; and detecting the displacement of the target by comparing the return signals and the stored reference data. A method of detecting the level of a sample in a container is also disclosed. Analogous apparatus features are also disclosed.

57 Claims, 9 Drawing Sheets

METHOD OF AN APPARATUS FOR DETECTING THE DISPLACEMENT OF A TARGET

BACKGROUND OF THE INVENTION

1. Field of the Invention

The present invention relates to a method of and apparatus for detecting the displacement of a target in a given environment, and also to a method of and apparatus for determining the level of a sample in a container, especially, but not exclusively, by radar techniques.

The invention relates particularly to liquid level sensing in a tank, but is also applicable to altimetry and intruder detection. It is most suited to relatively short range applications.

2. Related Art

It is known, for example from a paper entitled "Geophysical Radar Designs", by Oswald, G. K. A. (IEEE Proceedings, Volume 1–35, Part F, No. 4, August 1988), to detect the displacement of a target relative to its environment by transmitting a radio-frequency impulsive signal towards the target, sensing the return signals from the target and the environment, and detecting displacement of the target by detecting any Doppler shift in the return signal waveform by simple high pass or band pass filtering.

In that such a technique relies on the Doppler effect, it can only function successfully when there is a significant relative motion between the target and the environment (as would be the case, for example, if an aircraft were the "target" and the terrain were the environment). Such a technique cannot function at all when there is no relative movement between the target and the environment, since in this case there will be no Doppler shift. Hence this technique is not suitable for sensing the level of a sample in a container, since, in many cases, the level might be expected to change only slowly, if at all. For example, for petrochemical or soap tanks, changes of perhaps only 2.5 cm per day in level are commonly experienced.

A radar-based technique for measuring the level of a liquid in a tank is also known. In this technique, a narrow-beam, high frequency (for example 10–12 GHz), narrow bandwidth (for example 3% of the centre frequency) frequency modulated transmit signal is transmitted via an antenna of roughly 0.3 m diameter towards a small region of the liquid surface. It will be appreciated that the frequency has to be relatively high and the antenna has to be relatively wide in order to produce a sufficiently narrow beam so that only this small region of the liquid surface is irradiated. The displacement of the surface is detected by sensing the return signals from solely the surface.

Such a technique suffers from the disadvantages firstly that it is expensive to implement because of the relatively high frequency of operation. Secondly, it is limited by the size of its antenna to use in relatively wide tanks. Thirdly, it cannot take any account of the environment (in this case, the walls of the tank). This can lead to a loss of accuracy or effectiveness where the technique is used in a relatively small tank.

A further radar-based technique is disclosed in European Patent Application No. 88302996.9. A guided-wave level sensor based on wide-band technology is disclosed in United Kingdom Patent Application No. 8913720.2.

SUMMARY OF THE INVENTION

The present invention seeks to overcome the above problems, and especially to provide apparatus having resolution and performance similar to the prior art liquid level measuring apparatus, but at a significantly lower cost.

According to the present invention, there is provided a method of detecting the displacement of a target in a given environment, comprising:

storing reference data comprising data representative of the environment;

transmitting a transmit signal towards the target;

sensing the return signals from the target and the environment; and detecting the displacement of the target by comparing the return signals and the stored reference data;

the reference data being updated at an update rate which is varied in dependence on the displacement of the target.

By storing reference data comprising data representative of the environment and detecting the displacement of the target by comparing the return signals and the stored reference data, a displacement detection technique can be provided which can distinguish a target from its environment not only when their relative speed is high but even when there is no or very low relative motion. The comparison between the return signals and the reference data can serve to enhance the target return signal relative to the environment return signal ("clutter") and can additionally permit any timing changes, such as drift or delay changes, in the electronic circuitry of the apparatus to be taken into account.

Also, since the technique can take the environment into account, it is not necessary for it to operate either at relatively high frequency or with a relatively wide antenna. This can make the technique cheaper to implement than the known radar-based level sensing technique mentioned above, and can allow its use in relatively confined places.

Since the reference data are updated at an update rate which is varied in dependence on the displacement of the target, the target displacement may be more accurately detected. This "variable time constant" updating feature can, for example, allow the accurate detection of targets with very slow motion compared to the measurement rate, as well as velocities up to the maximum velocity that can be handled by the measurement rate. The feature is applicable to all the three preferred embodiments described herein.

In the preferred embodiments, the target is the surface of a sample (for instance, a liquid), and the environment is a container such as a storage tank, which may include specific internal features such as walkways or feed pipes. The transmission and sensing is typically of radio-frequency signals. The comparison may suitably be effected by some form of differencing technique.

The target displacement which may be detected may be the absolute location or range of the target relative to the environment or to some other location, its movement relative to a particular point, its velocity, its acceleration, or any other relevant positional parameter. The actual value of the displacement may be detected, or, for example, the detection may merely be such as to indicate that displacement has taken place.

In a first preferred embodiment, which can have the advantage of yielding an accurate measure of target displacement, the return signals are compared only with stored reference data representative of the environment. For economy of storage, if the transmit signal is transmitted from a transmitter, data representative of that part of the environment more distant from the transmitter than the target are not stored, although alternatively such data may be stored.

In a second preferred embodiment, which can have the advantage of tracking the target accurately even in the presence of significant clutter, the stored reference data with which the return signals are compared comprise data representative both of the environment and of the target. For processing simplicity, preferably the reference data are representative of target and environment return signals stored at the same instant.

In a third preferred embodiment, which is a hybrid of the first two embodiments, the return signals are compared with reference data representative of the environment, and, if no displacement of the target is detected from this comparison, are additionally compared with reference data representative of the target and environment.

Timing changes in the electronic circuitry of the apparatus may be taken into account more completely and the target displacement may be more accurately detected, if the stored reference data are representative of return signals sensed at at least one previous instant.

Particularly in the second preferred embodiment, preferably the stored reference data are only updated if displacement of the target is detected, since otherwise small, subliminal displacements or slow drift of the target might go undetected.

Since the method may be used for detecting small or even minuscule target displacements, preferably timing errors, such as might be caused by delay changes or drift in the electronic circuitry of the apparatus, are detected and compensated for.

Hence, preferably the relative timing of the reference data and the return signals is compared and compensation is made if any timing error is detected from the comparison.

To compensate for delay changes, the respective timings of a reference point on the return signal waveform and on the reference data may be compared. For example, such a reference point might be the direct wave transmitted between the transmitter and the receiver or the direct leakage-of the transmitted signal into the receiver.

To compensate for drift, the interval between two reference points on the return signal waveform may be compared with a reference value, and compensation may be made if any timing error is detected from the comparison.

Gain compensation may also be required, and this is preferably effected via a comparison between the respective amplitudes of a reference point on the return signal waveform and on the reference data.

There are several possible techniques which may be employed in the initial acquisition of the target. These may, if appropriate, be used in combination. For example, data representative of the environment may be determined in the absence of the target. The target may be initially identified as the first feature for which a displacement is detected, or the target may be initially identified by the user.

For processing economy, preferably data representative of a predetermined portion of the environment adjacent the target is stored, the storage of data being arranged to keep track of movement of the target. Hence processing can be carried out in a relatively narrow processing window.

Preferably, the transmit signal has a frequency in the radio-frequency range (preferably in the range 1 MHz to 1000 GHz, more preferably in the range 100 MHz to 10 GHz), the return signals are frequency down-convened to the audio-frequency range (preferably 0 Hz to 20 kHz), and data processing in the detection step takes place at least partly in the audio-frequency range. In this way, the cost of the apparatus can be considerably reduced, since components which function in the audio-frequency range are often very considerably cheaper than those which function in the radio-frequency range.

If the transmit signal is transmitted by a transmitter, then preferably target displacement data produced in the detection step are compensated in dependence on the distance of the target from the transmitter. This can ensure that the target return signal is given equal weight however far from the transmitter it is.

If, as is preferred, the target displacement is detected in dependence on a difference waveform derived by comparing the return signals and the stored reference data, and preferably derived by subtracting one of the return signals and the reference data from the other, then preferably the target displacement is detected in dependence on the location of an edge of the difference waveform in the region corresponding to the target position. This can afford a particularly accurate determination of target displacement, because it can minimise the effect of receiver noise on measurement accuracy. It is also possible to define target displacement in terms of peaks or troughs in the return signal waveform.

The invention can also provide various alarm signals to warn the user of potential problems or failures. For example, if the velocity or acceleration of the target is detected, an alarm signal may be produced if the velocity or acceleration exceeds a predetermined threshold value. This could provide a warning of abnormal target behaviour. As another example, an alarm signal may be produced if the amplitude or change in the amplitude of a reference point on the return signal waveform exceeds a predetermined threshold value. This can warn the user of equipment failure, which would often cause excessive amplitude changes.

The invention extends to apparatus for detecting the displacement of a target in a given environment, comprising:

means for storing reference data comprising data representative of the environment;

means for transmitting a transmit signal towards the target;

means for sensing the return signals from the target and the environment; and means for detecting the displacement of the target by comparing the return signals and the stored reference data;

the storage means being adapted to update the reference data at an update rate which is varied in dependence on the displacement of the target.

According to a closely related aspect of the present invention, there is provided a method of determining the level of a sample in a container, comprising:

transmitting a broadband transmit pulse towards the sample, the pulse having a bandwidth greater than 20% of its centre frequency;

sensing the return signal from the sample; and determining the level of the sample from the return signal.

The level being determined may, for instance, be associated with the surface of the sample. The sample may, for example, be a liquid.

By working at a considerably wider relative bandwidth than in the prior art liquid level sensing apparatus, apparatus according to the present invention can be built more cheaply than the prior art apparatus (perhaps at only one fifth of the cost), in that it can operate at considerably lower frequency. Components for this type of apparatus designed to operate at frequencies near 10 GHz may be considerably more expensive than components designed to operate at lower frequencies, say, 2.5, 3 or 5 GHz.

The bandwidth is preferably greater than 40%, more preferably greater than 60% or even 75% or 100% of the centre frequency of the transmit pulse.

Using the proposed wide relative bandwidth allows operation at the relatively low frequency of 5 GHz. At such a low frequency, the method of this second aspect of the present invention produces a significantly broader beam than that produced in the prior art, and hence is considerably more likely to pick up return signals from the walls of the containers as well as from the sample. For this reason, the features of the first aspect of the invention may advantageously be combined with this aspect.

Since high range resolution can be achieved at the relatively low frequency of 5 GHz or less, reflection off the walls of the container can be accurately resolved into different range bins, which can help to minimize the clutter in a given range bin.

Hence operation at a lower frequency is beneficial to the features of the first aspect of the invention.

The invention extends to apparatus for determining the level of a sample in a container, comprising:

means for transmitting a broadband transmit pulse towards the sample, the pulse having a bandwidth greater than 20% of its centre frequency;

means for sensing the return signal from the sample; and means for determining the level of the sample from the return signal.

In all aspects of the invention, apparatus features may be provided analogous to the method features herein described, and vice versa.

BRIEF DESCRIPTION OF THE DRAWINGS

Preferred features of the present invention will now be described, by way of example only, with reference to the accompanying drawings, in which.

DETAILED DESCRIPTION OF EXEMPLARY EMBODIMENTS

Figure 1:
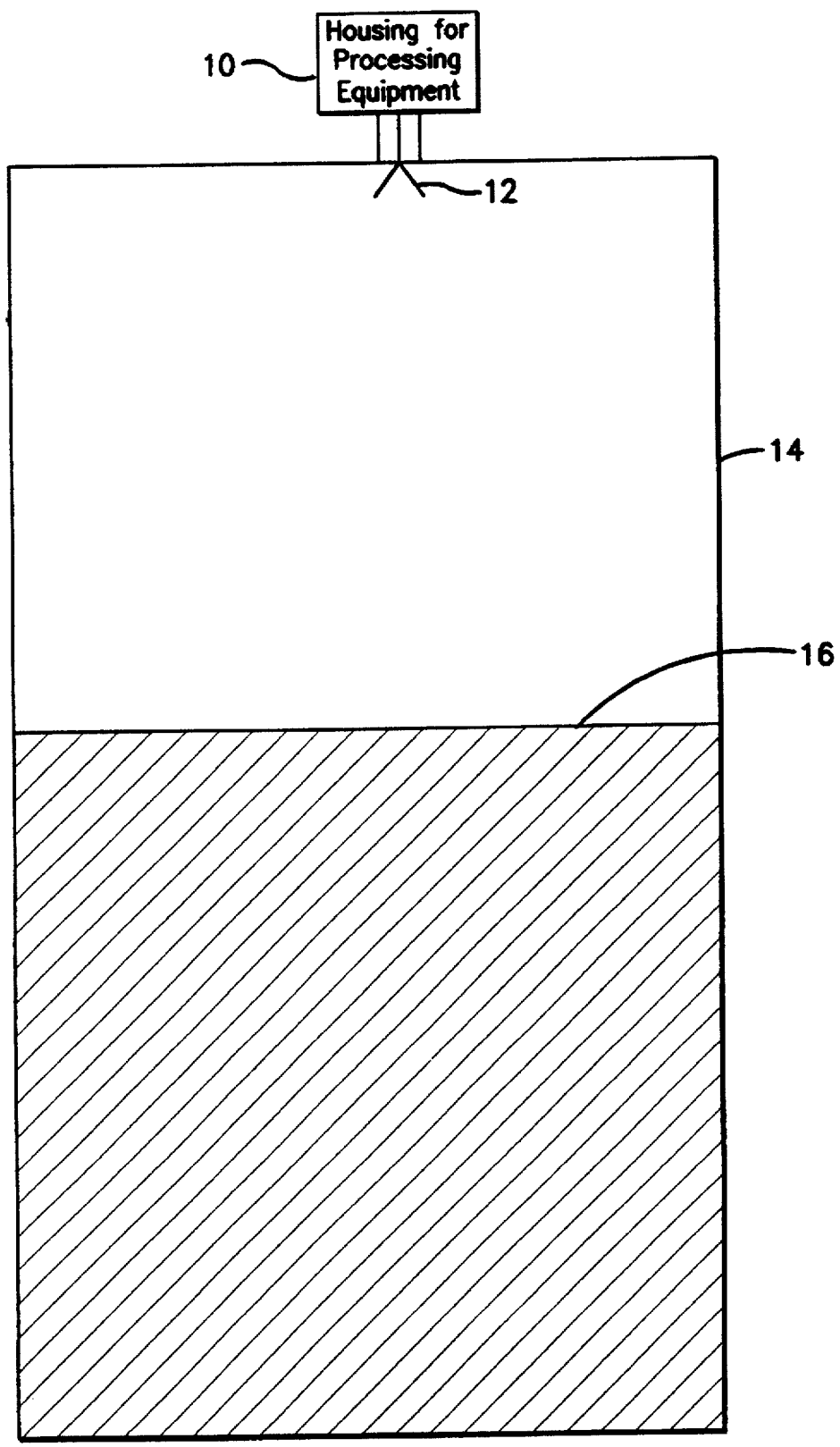
FIG. 1 is a sketch of apparatus for detecting the displacement of a target in its environment according to the present invention.

Referring now to FIG. 1, apparatus for detecting the displacement of a target comprises generally processing equipment housed within a housing 10, and a radio-frequency transmitter and receiver coupled to the-processing equipment and taking the form of a combined transmit/ receive antenna 12 including separate active elements for transmit and receive. The height of the antenna in this embodiment is 0.15 m; its diameter is 0.07 m. Hence it is sufficiently narrow to be mounted in confined spaces, such as the narrow feed pipe of a storage tank.

The apparatus is arranged at the top of a tank 14 holding liquid 16 such that it can transmit broadband radio-frequency transmit pulses to the liquid and the tank walls and sense the reflected return signals from these features.

The apparatus is designed to operate at a centre frequency of 2.5 GHz, over a bandwidth of 2 GHz, that is, in a range from 1.5 to 3.5 GHz. Hence it produces a broad transmit pulse, such as would in general generate return signals not only from the liquid surface but also from the walls of the tank.

Figure 2A:
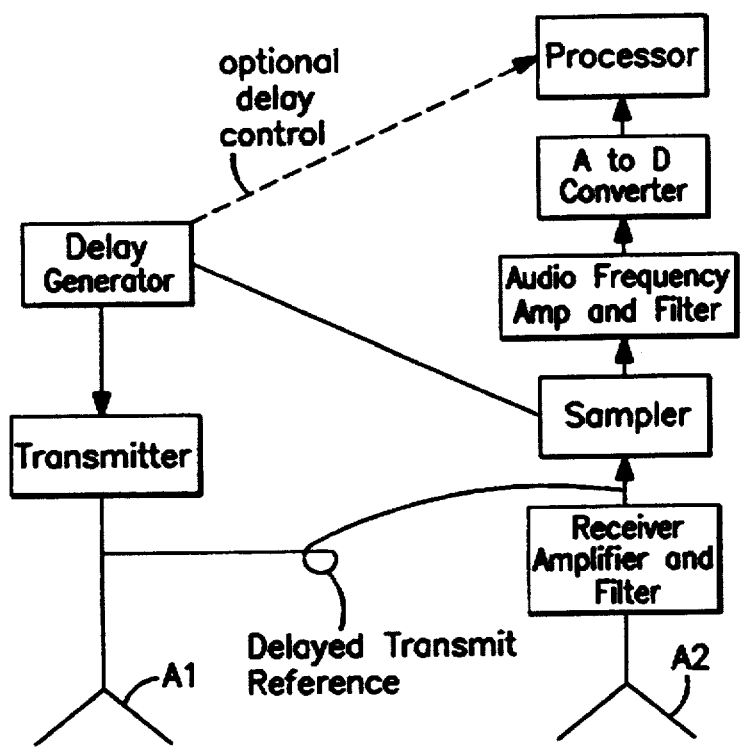
FIGS. 2a and 2b are block diagrams showing the architecture of the apparatus.

The architecture of the target displacement detection apparatus is now described in general terms with reference to FIG. 2a. A delay generator D1 containing a precise timing reference such as a crystal oscillator produces timing pulses to trigger the transmitter T1 to produce a radio-frequency transmit pulse. This is propagated into space by the transmitting antenna A1 and reflected off the various targets and their environment (clutter). The reflected return signals are detected by the receiving antenna A2, amplified and filtered by module R1, which includes a 1 to 4 GHz bandpass filter to exclude out of band interference, and then sampled by sampler S1. The sampler S1 is essentially the same as that disclosed in International Patent Application No. PCT/GB90/00602. The sampling times are controlled by the delay generator D1 to sample the return signals at a sequence of well defined regularly spaced delays after the transmitter transmits. The sampler S1 downconverts the signals to a low frequency audio signal. This signal may be low pass filtered by audio-frequency amplifier and filter AF1 to maximise the signal-to-noise ratio. It is then digitised by analogue-to-digital converter ADC1 and processed using processor P1. The transmitter T1 produces a delayed transmit reference pulse which is injected into the sampler S1 for timing compensation. In an alternative embodiment, this reference could be supplied by the direct wave from a subsequent measured waveform or, as explained later, by one or more clutter features.

Figure 2B:
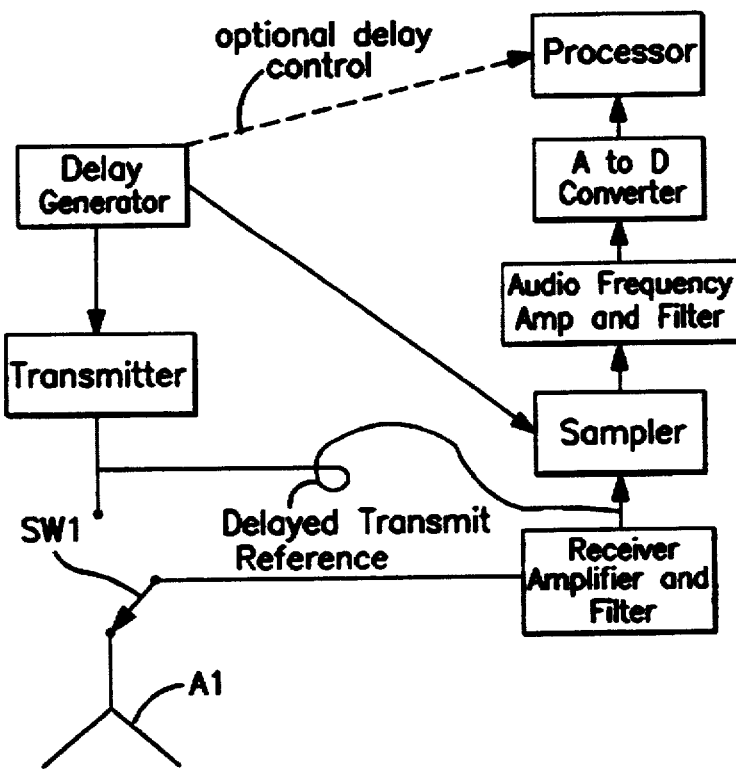

In a variant of the present invention illustrated in FIG. 2b, the antenna A2 is replaced by a switch SW1 which connects a single antenna to the transmitter T1 and the receiver R1 in turn.

Figure 3:
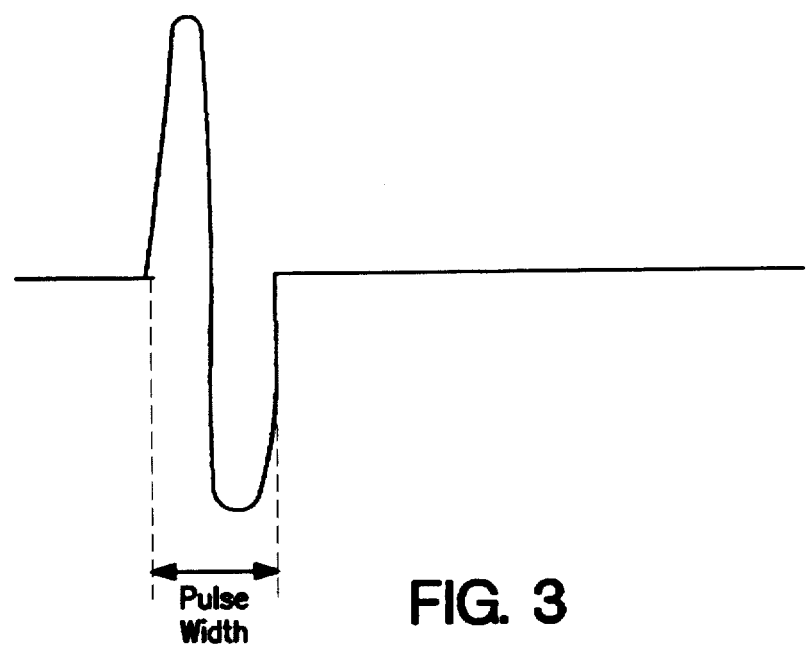
FIG. 3 illustrates a transmit pulse transmitted by the apparatus.

The typical shape of a transmit pulse is shown in FIG. 3. The shape of this pulse is not critical so long as it corresponds to a frequency band which is wide relative to the centre frequency of operation. For example, it could alternatively comprise 1½ cycles rather than one cycle. The delay generator D1 is arranged to repetitively produce relatively short pulses centred on a frequency of 2.5 GHz. The use of short pulses allows clutter to be resolved satisfactorily at different ranges.

The operation of the preferred embodiments of the present invention is now described in overview with reference to FIGS. 4 and 5, which show the reflected return signals following the transmission of the transmit pulse at earlier and later instants $T_1$ and $T_2$ separated, say, by one time step, tstep. The signals are shown after conversion into the audio-frequency range. The regularly spaced sampling times-are denoted by crosses on the return signal waveforms. The waveforms exhibit, in time sequence, a direct wave, which is the wave transmitted directly between the two antennae (or, in the case of the FIG. 2b variant, a reference signal caused by transmitter leakage). The direct wave is followed by return signals from the environment (also known as "clutter"). Unless the context otherwise demands, the clutter is defined as return signals from all features prior to the target return signal (that is, usually prior to the leading edge of the target return signal). However, direct clutter can be at longer delays than the liquid surface if, for example, the radius of the tank is greater than the liquid depth. In such circumstances, the clutter may be defined as return signals from all features other than the target return signal, but excluding multipath echoes. In the case of liquid level sensing in a container, the clutter will therefore be due to features of the container above the liquid level, and the target return signal will be due to the liquid level itself. The clutter is followed by the target return signal at a delay time td after the direct wave. The target return signal is itself followed by multipath echoes from various features of the container and liquid. Finally, these are in turn followed by the delayed transmit reference pulse.

At the later instant $T_2$, following a further transmit pulse, the return signal waveform may have changed, for instance due to movement of the environment or of the target, or due to delay changes or drifts in the electronic circuitry.

Figure 4:
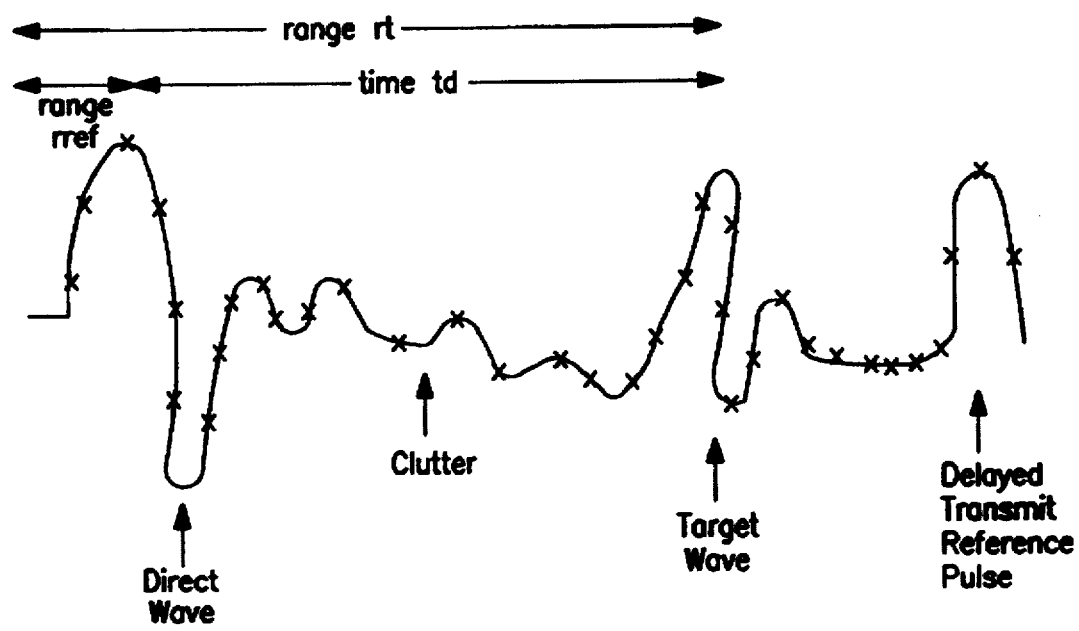
FIG. 4 illustrates the return signals at a time $T_1$ following transmission of the transmit pulse.
Figure 5:
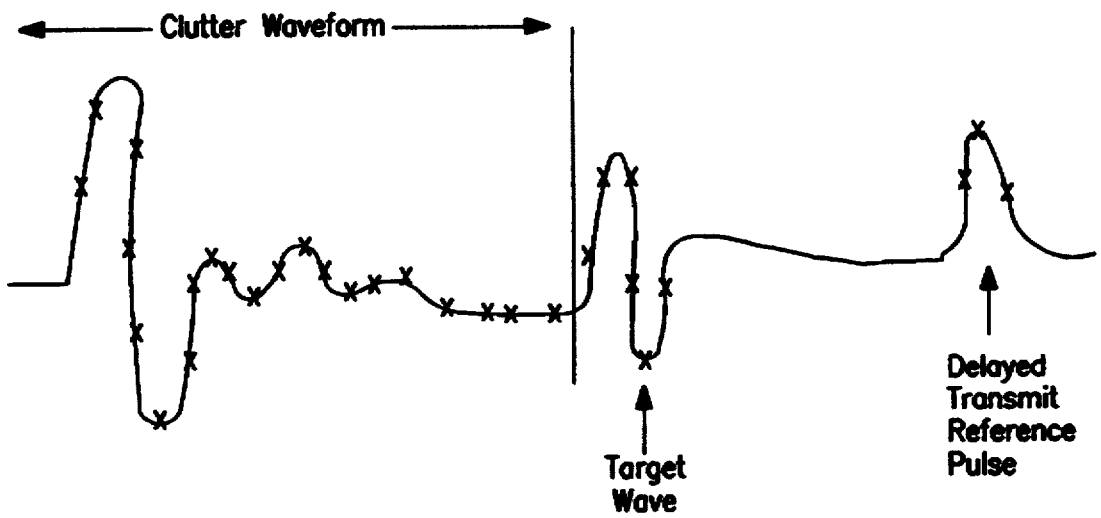
FIG. 5 illustrates the return signals at a later time $T_2$.

In the preferred embodiments, the effects of changes in the environment and in the electronic circuitry are minimised by subtracting at least a portion of the waveform shown in FIG. 4 relating to the environment close to the target from the waveform of FIG. 5, so as to enhance the target return signal relative to the clutter. The target is then identified in the difference waveform thus produced as the first or the highest amplitude signal above a certain threshold.

However, if the signal to clutter ratio is sufficiently high, the differencing technique described above may not be necessary. In this case, the target is identified in the return signal waveform as the highest amplitude signal after the direct wave. The signal to clutter ratio may be sufficiently high, for example, in the ease of water level being sensed in a relatively large diameter container.

Once the target has been identified at the new time instant $T_2$, the displacement of the target is then computed from the following equation:

$$rt = c^* td/2 + rref \qquad \text{Equation 1}$$

where rt is the range of the target, c is the speed of light through the propagating medium (which is typically air, but might be a non-conducting fluid such as a petrochemical), and rref is the correction to be applied for the direct wave delay, which in the two antenna form of the apparatus will approximate to the separation between the antennae. The target range, velocity and/or acceleration, as appropriate, may be determined using Equation 1.

Figure 6A:
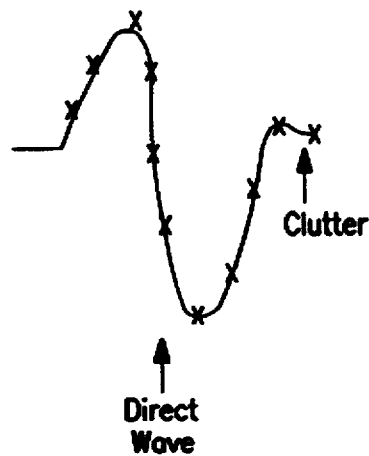
FIGS. 6a and 6b illustrates the use of a sampling window in the processing of the return signals.
Figure 6B:
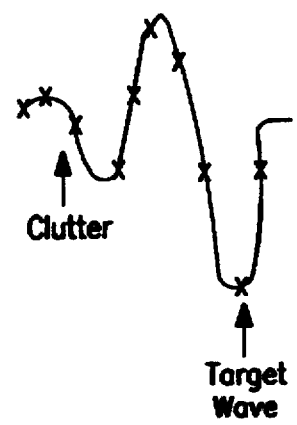

A variant of the present invention is now described with reference to FIGS. 2a, 2b 6a and 6b. In this variant (see the dotted connection in FIGS. 2a and 2b) the processor P1 is connected to the delay generator D1. The processor controls the sampling delay of the sampler S1 to track the target in a relatively narrow window encompassing the target. The processor also controls the sampling delay to track the direct wave in a further relatively narrow window. Tracking is based on predictions of target position. This is illustrated in FIGS. 6a and 6b, which show a return signal waveform processed as described above.

Using this technique, processing bandwidths may be minimised, especially when only a single target is of interest. This may be of considerable practical importance. For example, if liquid level is being sensed in a 20 m tank at a 4 mm data point spacing and a one second time step spacing, and the maximum liquid level change is known to be, say, 400 mm per second, a considerable saving in processing power and time may be achieved if a window of only, say, 1 m of the environment adjacent the target is tracked at any one instant.

It will be appreciated that the apparatus described with reference to FIGS. 2i aand 2b may be modified in a number of ways. For example, a book entitled "Introduction to Radar Systems", Second Edition 1981, by Skolnik, M. I., published by McGraw-Hill, discloses at pages 420 to 434 various synthetic pulse modulation schemes which utilise signal processing to produce compressed pulses which are significantly shorter than the radiated pulse. In particular, FM pulse compression and phase coded pulse compression schemes are disclosed. Either of these schemes could be utilised with the present invention. In either case, the compressed waveform could be digitised to produce a similar audio output to that shown in FIG. 4, and hence processed appropriately. A block diagram of the transmit/receive electronics for FM pulse compression is given in FIG. 11.14 of this reference.

The operation of three particularly preferred embodiments of the invention is now described. In a first preferred embodiment, for accurate detection of target displacement the effects of changes in the environment and in the electronic circuitry are minimised by subtracting out just the clutter, as sensed at a previous instant, from the return signals generated at a later instant; in a second preferred embodiment, these effects are minimised by subtracting out both the clutter and the target return signal, as sensed at a previous instant, from the return signals generated at a later instant; a third preferred embodiment is a hybrid of the first two preferred embodiments, which seeks to use the most advantageous aspects of both.

1. THE CLUTTER SUBTRACTION TECHNIQUE

Referring specifically to the first preferred embodiment (the "clutter subtraction" technique), the processing of the return signals is carried out in the following steps:

1. Target acquisition, where the target of interest is identified.
2. Delay change and drift compensation, using the direct wave and/or known clutter.
3. Gain compensation, using the direct wave amplitude.
4. Moving target detection, by variable time constant clutter subtraction. (By "variable time constant" is meant that clutter from various preceding instants is subtracted).
5. Precision target location.
6. False alarm rejection, based on maximum velocity or acceleration criteria.

Figure 7:
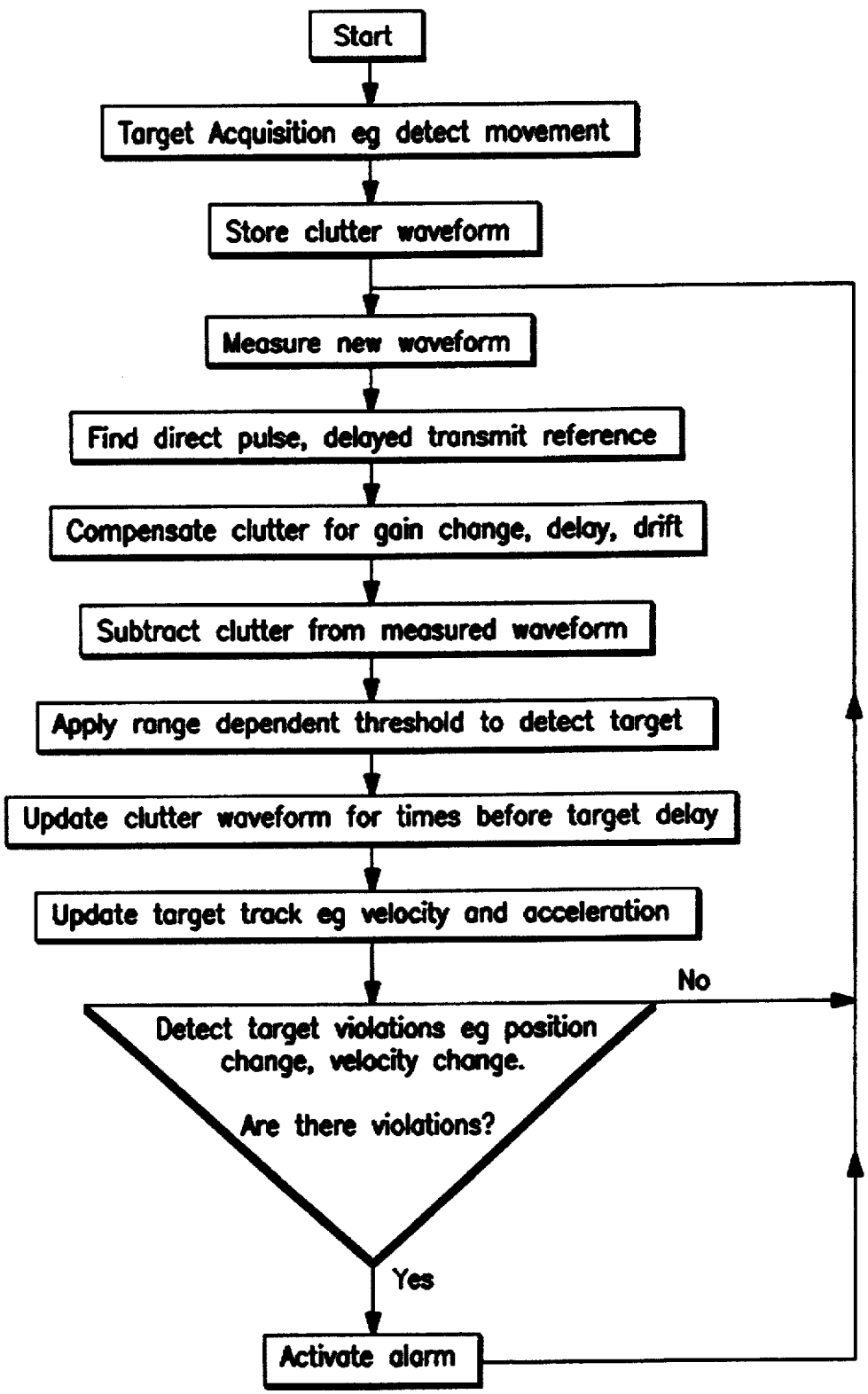
FIG. 7 is a flow chart illustrating the signal processing in a first preferred embodiment of the invention.

These steps are illustrated in the flow chart of FIG. 7.

Each of these steps is now considered in more detail with reference to FIGS. 7 to 10.

1.1 Target Acquisition

There are three major possibilities for the initial acquisition of the target once the apparatus has been installed.

(a) If the apparatus can be calibrated without the target present (for example, with no liquid in the container), then a complete "clutter waveform" is stored and used in the differencing procedure described in Section 1.4 below to identify the target.

(b) If circumstances preclude calibration in the absence of the target (such as might be the case if it is not possible to empty the container) then a reference waveform comprising the entirety of the return signal waveform is stored and measurements are taken at regular intervals until a change is observed. This change is identified with the target having moved. Then the target location in the difference waveform with respect to the direct wave is calculated and stored. Finally, the waveform up to the target position is stored as the "clutter waveform". This technique is particularly appropriate where the target has a low radar cross-section (such as petrol).

(c) If the user knows where the target is, this information can be input to the apparatus, and the waveform up to the target can be stored as the "clutter waveform". The clutter waveform after this point is padded with zeros. This technique is particularly appropriate where the target has a high radar cross-section (such water).

1.2 Delay Change and Drift Compensation

The concepts of delay change and drift compensation are now described with reference especially to FIG. 8.

Figure 8:
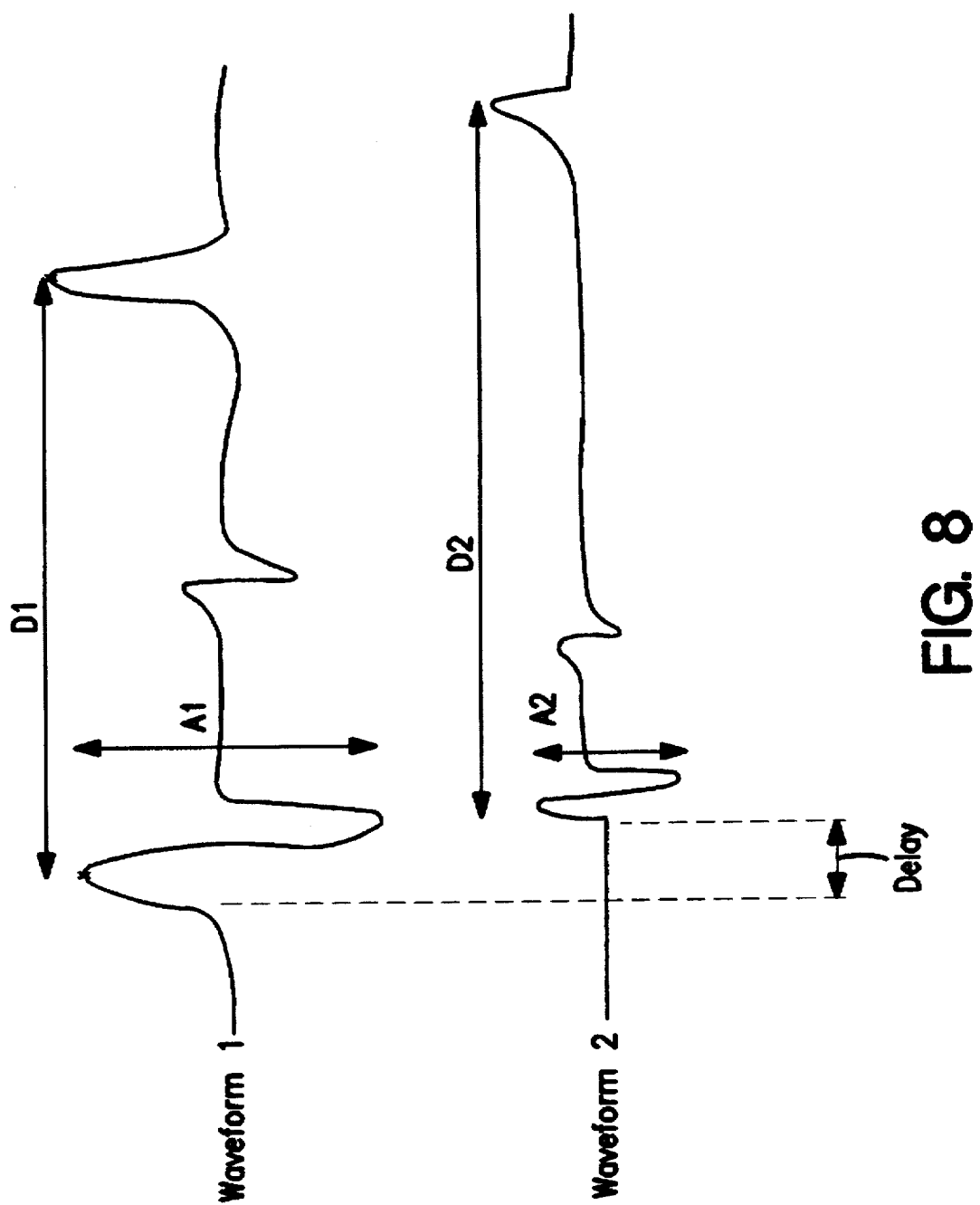
FIG. 8 illustrates the concepts of delay change, drift and gain compensation in relation to the return signal waveform.

Delay change is manifested in FIG. 8 as the overall timing difference between waveform 1 at one instant and waveform 2 at a different instant. The timing difference may be measured at any convenient reference point in the waveforms, such as the leading edge of the direct wave. Delay change is caused primarily by changes in delay through the components of the apparatus. For example, the delay of electromagnetic waves through cables and active devices varies with temperature.

Drift is manifested in FIG. 8 as the timing difference between D1 and D2. D1 and D2 being measured between two corresponding reference points respectively on waveform 1 and waveform 2. Drift is defined as D2/D1, and is equal to the ratio of the sampling intervals. Drift is usually associated with a change in slope of the delay generator D1, for example caused by a drift in the reference crystal oscillator within the delay generator.

In the present invention, the preferred method of delay and drift compensation is as follows.

(a) The positive and negative peaks of the direct wave are located.

(b) Curve fitting around these peaks is carried out to locate the positions of the maxima. For example, the maxima and minima of the sampled waveform could be located, and a quadratic fit employed to find the peaks.

(c) The measured waveform and the reference waveform are aligned so that they both have the direct wave at the same delay. Interpolation may be used if necessary. This compensates for delay changes in components.

(d) The delayed transmit reference pulse is located and the interval evaluated between the direct wave and this reference. Again curve fitting is carried out to find the peak of the delayed transmit reference as in (b) above. If the delayed transmit reference is unavailable then the time interval between the direct waves in two successive measured waveforms is evaluated.

(e) The sampling interval is evaluated as the time between the direct wave and the delayed transmitter reference divided by the number of samples between them. The time between these two points is factory set and so is known accurately. If any shift in the data is found to be required due to drift in the sampling interval, this is achieved by padding the data with leading or trailing zeros, or by any other appropriate means (such as leaving undefined points unaltered). This compensates for any drift in the return signal waveform.

An adjustment in the sampling interval could alternatively be effected by a frequency analysis of the direct wave which would identify an apparent frequency change caused by the variation in sampling interval.

It will be appreciated that the above delay change and drift compensation techniques essentially use the known characteristics of the clutter to calibrate out long term delay changes and drifts.

If multiple clutter return signals are available, it is possible to improve the delay change and drift compensation by averaging over a number of clutter features. Furthermore, one or more of the clutter return signals could be used in the compensation techniques instead of the delayed transmit reference pulse or the direct wave. If desired, extra clutter features, such as a metal plate on the wall of a tank, could be deliberately introduced into the environment, so that the advantages of using multiple clutter features could be realised.

It will also be appreciated that the above delay change and drift compensation techniques may not always need to be employed, since some delay change and drift compensation is in any case afforded by subtracting the stored clutter waveform from the return signals. Whether this latter compensation is sufficient depends on the apparatus used and on the surrounding circumstances.

1.3 Gain Compensation and Health Monitoring

Referring again to FIG. 8, the gain A1 in waveform 1 at one instant may be different from the gain A2 in waveform 2 at another instant. Gain change is defined as A2/A1. Gain change may be caused by equipment malfunction or by a slow drift in the transmitter power or receiver sensitivity.

Gain change can be detected by estimating the amplitude of the direct wave for each waveform by a process of curve fitting and interpolation around the direct wave, as described in Section 1.2 above.

If the gain change is due to equipment malfunction (hence causing a gross amplitude change above a given threshold), then an alarm is activated to warn the user of a malfunction.

If the gain change is due to slow drift in the equipment, it is compensated for by an appropriate adjustment in the amplitude of waveform 1 or 2.

Gain compensation may also be required if the direct current offset of the sampler S1 drifts with temperature. Compensation is provided by subtracting a fixed offset from the measured waveform. This offset can be derived either as the mean value of the return signal waveform or else from sampling the received waveform before the transmit pulse arrives (that is, in the absence of excitation from a transmit pulse). Alternatively, the output of the sampler S1 may be capacitively coupled into the AF amplifier AF1 to remove dc drift effects.

1.4. Moving Target Detection

Figure 9:
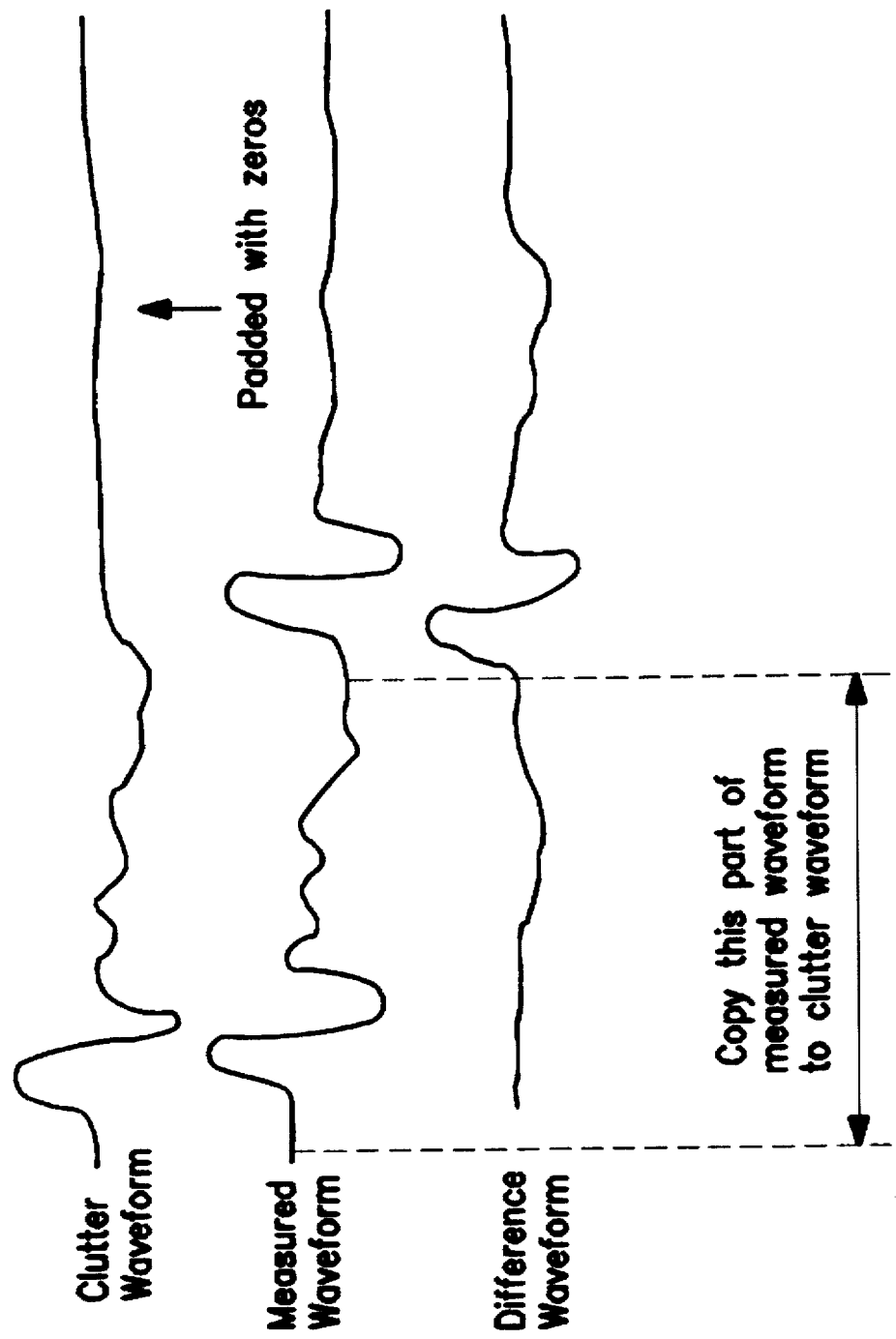
FIG. 9 illustrates how the target displacement is detected for the first preferred embodiment.

The detection of the displacement of the target is described with reference to FIG. 9. Following each transmit pulse, a clutter waveform stored at a previous instant (normally the immediately previous instant) is subtracted point by point from the current, compensated return signal waveform, to derive a difference waveform. A thresholding process is applied to the difference waveform. The threshold depends on range (or else the transmitter power is increased at longer range, or the gain of the receiver is range dependent) so as to be able to detect small targets at long range while rejecting high amplitude clutter at short range. If the target has moved, this movement can be detected from an analysis of the difference waveform once the thresholding process has been applied. In single target applications, the target is normally identified as the first reflection above threshold as this rejects automatically multipath echoes. Multipath echoes are signals which arise from the target by other than the direct path, for instance, a transmit pulse reflected off the walls of a tank on to the liquid level and thence back to the receiver.

The target delay td is evaluated by working out the delay between the peak corresponding to the target in the difference waveform and the position of the direct wave in the current return signal waveform. Alternatively, any other consistent point in the difference waveform could be used, such as a point on the leading edge of the target return signal. The target range can then be derived from Equation 1.

The clutter waveform is updated to the point just before the leading edge of the target return signal. In the preferred embodiment, the rest of the clutter waveform is unaltered, but other strategies, such as padding the waveform with zeros, are possible. Since the update rate can be rapid (many times per second), the drift between measurements will be small and so there is no danger of false alarms from the clutter drift. Whenever the liquid level falls below the initially acquired level (as described in Section 1.1) the range of the clutter waveform is extended out, towards the maximum range of the system, to the new liquid level. If a clutter peak should suddenly appear (for instance from an object that was under the liquid level surface), it should be registered as clutter as soon as a measurement occurs where the target moves and the clutter is stationary. This property means that the system should recover from transient targets in the field of view of the sensor (for example, if a user steps into the field of view).

Whenever the liquid level rises again, for computational economy only that portion of the clutter waveform up to the target return signal need be retained in storage. Alternatively, all of the clutter waveform may be retained in storage. In both cases, only the clutter waveform up to the target return signal is actually updated. It will be seen that the latter alternative of retaining all of the clutter waveform represents a variable time constant clutter subtraction procedure.

The target velocity is estimated from the change in range of the target from the previous measurement. This velocity can be used to predict the location of the target at the next measurement and hence narrow the search area for the target by allowing data processing to be carried out only in a given window (as described previously). This reduces the processing bandwidth required. Likewise the acceleration can be similarly estimated.

Suppose three successive measurements of the target range are $r0$, $r1$ and $r2$, and the time between successive transmit pulses is tstep. Then estimates of the velocity at time zero and the acceleration at time zero (corresponding to position $r0$) are:

$$v0 = (4*r1 - 3*r0 - r2)/(2*tstep) \quad \text{Equation 2}$$

$$a0 = (r2 - 2*r1 + r0)/(tstep^2) \quad \text{Equation 3}$$

These can be used to provide updated smoothed estimates of acceleration and velocity:

$$v = K*v0 + K1*vold \quad \text{Equation (4)}$$

$$a = Ka*a0 + K1a*aold \quad \text{Equation (5)}$$

where aold and vold are the last estimates of acceleration and velocity and K, K1, Ka, K1a are filter constants chosen based on a knowledge of the maximum rate of change of acceleration of the system. These estimates can be used in addition to the techniques described in Section 1.6 to provide warning signals if the target motion is unfavourable or safety levels might be breached.

It will be understood that this first embodiment can measure target displacement particularly accurately provided that the relevant target can be uniquely identified.

1.5 Precision Target Location

The approximate position for the target found by the difference and thresholding process described above may be refined in three ways:

(a) Correlation detection may be performed around the peak of the target return signal to lower the false alarm rate. In general, this processing method is not preferred for the first preferred embodiment, as the other procedures mentioned below require less processing bandwidth and can be as accurate.

(b) Curve fitting may be carried out around the detected peak to form a precision estimate of the peak of the target waveform.

Figure 10:
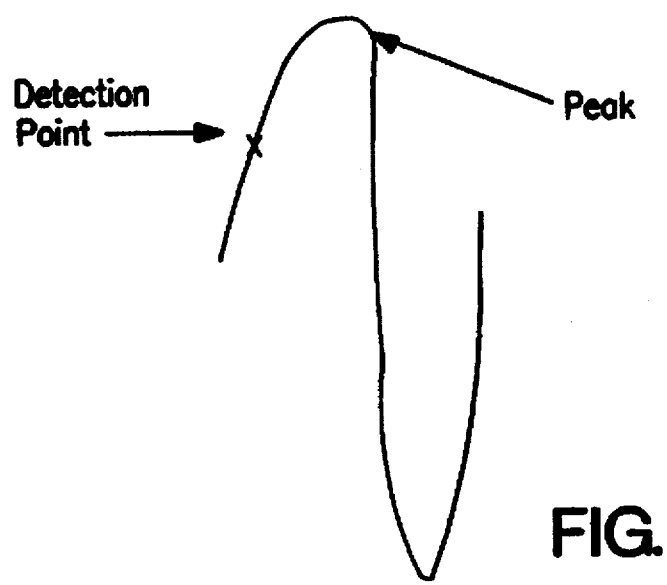
FIG. 10 illustrates the preferred technique for precision target displacement detection.

(c) In situations where the signal-to-noise ratio is more marginal, the most accurate measurement of position may be made on an edge of the target return signal waveform because, for the same amount of amplitude jitter, there is a minimum time shift in the waveform. At the peak, on the other hand, noise may have more effect on the signal because the slope of the signal is zero. Thus, having evaluate the position of the peak of the waveform, a precision detection decision may be made based on the half amplitude point of the rising edge. This is illustrated in FIG. 10, where the half amplitude point is denoted as the "Detection Point".

1.6 False Alarm Rejection

The introduction of a transient target into the environment (such as a user entering a large storage container) can be detected according to whether the speed of this target violates a specified maximum target speed. Such a transient target is treated as a "false alarm". If such a target is detected, the location of the genuine target is stored to optimise reacquisition of this genuine target when the transient target is removed. Unusual noise in the return signal waveform is treated in the same fashion.

If the transient target apparently persists for too long (for example, longer than a specified duration), then an alarm is raised, on the basis that the transient target is not transient at all, or that the violation of the maximum target speed indicates unfavourable or unsafe target motion.

In one embodiment, the alarm is such as to decay once the transient target has been removed.

The condition for a valid new target position $r1$ (such as would cause the alarm to decay) a time tstep after a measured position of $r0$ with a specified maximum speed vmax is:

$$r0 - vmax * tstep < r1 < r0 + vmax * tstep \quad \text{Equation 6}$$

Additionally, if the target motion is used to evaluate target speed, bounds on acceleration can be used to identify other non-physical motions of the target to base alarms on. For the $r1$, $r0$ and tstep as above, with an estimated speed of $v$ (which may be positive or negative) and a maximum acceleration of amax:

$$r0 + v*tstep - 0.5*a_{max} * tstep^2 < r1 < r0 + v*tstep + 0.5*a_{max} * tstep^2 \quad \text{Equation 7}$$

2. THE DIFFERENCE PROCEDURE TECHNIQUE

Referring specifically to the second preferred embodiment (the "difference procedure" technique); the processing of the return signals is carried out in essentially the same way as the steps stated in Section 1 above in relation to the first preferred embodiment, except that the moving target detection may be considered as being effected by a somewhat different, variable time constant high pass filtering technique.

A stored reference waveform representative of the clutter and target return signals from a selected previous instant is subtracted from the current return signal waveform to produce a difference waveform. The relevant process steps are illustrated in the flow chart of FIG. 11.

Figure 12:
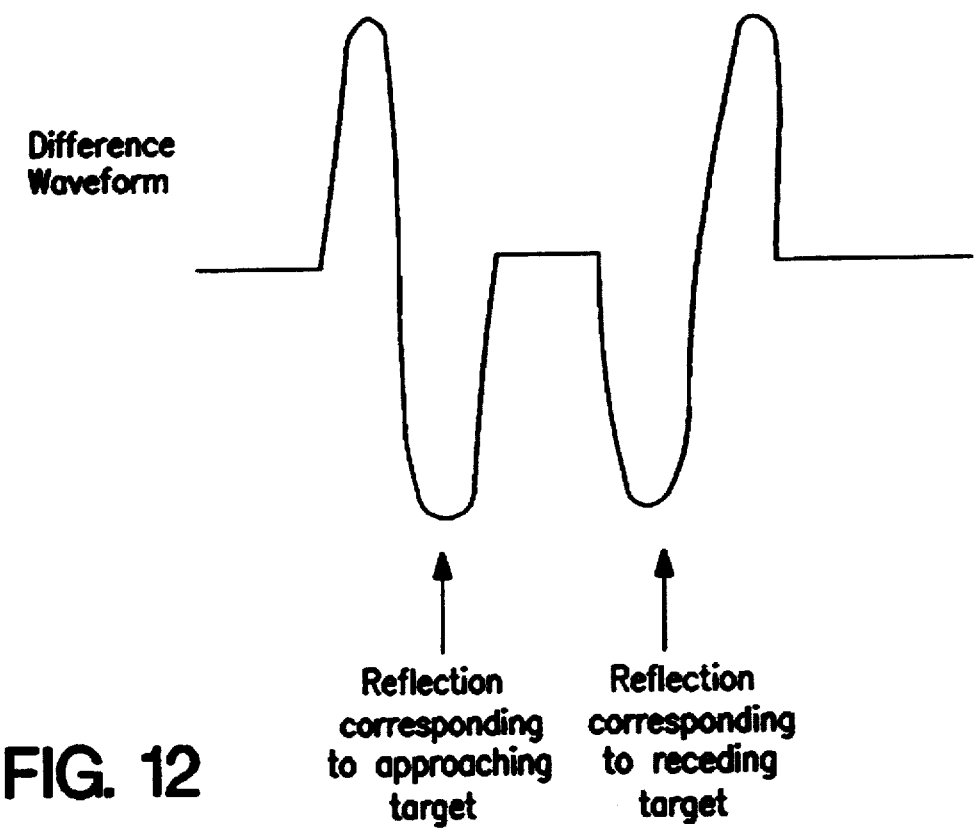
FIG. 12 illustrates how the target displacement is detected for the second preferred embodiment.
Figure 11:
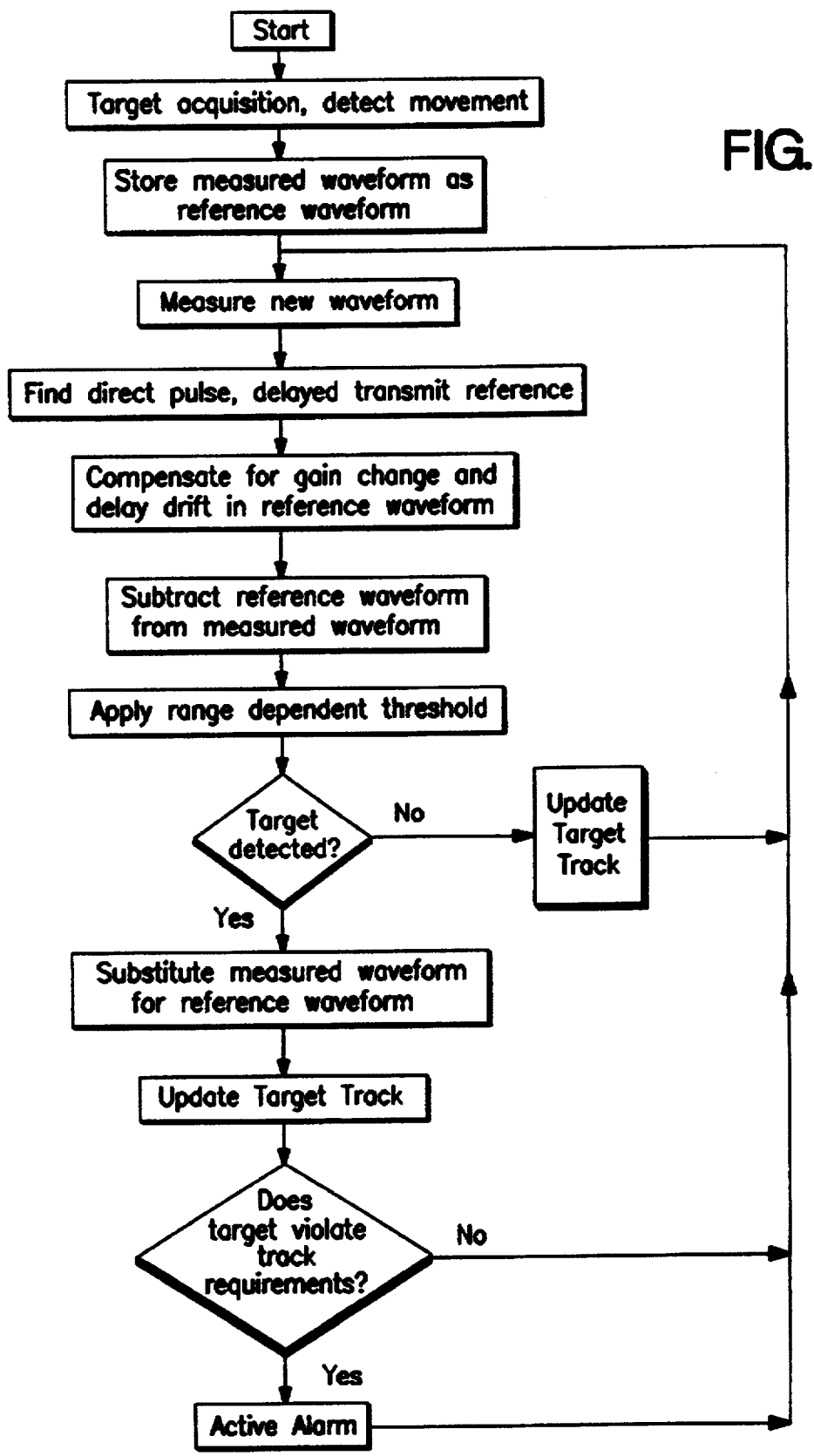
FIG. 11 is a flow chart illustrating the signal processing in a second preferred embodiment of the invention.

Each of these steps is now considered in more detail with reference to FIGS. 11 and 12.

2.1 Target Acquisition

The same basic target acquisition techniques as proposed in Section 1.1 are applicable to the procedure of the second preferred embodiment.

(a) If the apparatus can be calibrated without the target present, then a complete clutter waveform is stored as the reference waveform; this is used in the differencing procedure described in Section 2.4 below to identify the target.

(b) If the circumstances preclude calibration in-the absence of the target, then a reference waveform comprising the entirety of the return signal waveform is stored and measurements are taken at regular intervals until a change is observed. This change is identified with the target having moved. Next, the target location is calculated and stored. Finally, the return signal waveform at the instant of the change is stored as the reference waveform.

(c) If the user knows where the target is, this information can be input to the apparatus, and the entire return signal waveform is stored as the reference waveform.

2.2 Delay Change and Drift Compensation

The same techniques of delay change and drift compensation as described in Section 1.2 above in relation to the-first preferred embodiment apply equally to the second preferred embodiment.

2.3 Gain Compensation add Health Monitoring

The same techniques of gain compensation and health monitoring as described in Section 1.3 above in relation to the first preferred embodiment apply equally to the second preferred embodiment;

2.4 Moving Target Detection

Following each transmit pulse, the previously stored reference waveform is subtracted point by point from the current compensated return signal waveform to derive a difference waveform. As with the clutter subtraction technique described in Section 1 above, a range-dependent threshold is applied to the difference waveform to identify the target. Again, the target is normally identified as the first reflection above threshold as this rejects automatically multipath echoes. In the case of the difference procedure of the second preferred embodiment, the polarity of the difference waveform reverses for a target approaching the transmitter compared to one receding from it, as illustrated in FIG. 12. Thus the thresholding process tests the absolute or rectified amplitude of the difference waveform.

If the target has moved then the current measured return signal waveform is substituted for the stored reference waveform. Otherwise, the stored reference waveform is retained. This feature of retaining the reference waveform is important, since if the target moves only a fraction of a pulse width the difference will be small and hence rejected by the processing. Thus, if a target moves at a constant but very slow speed, in the absence of this feature its movement would not be detected by the difference procedure since all the differences between successive time steps would be small.

The target delay and hence the target range are evaluated in the same way as described in Section 1, as are the target velocity and target acceleration.

Referring again to FIG. 12, the first peak in the difference waveform will lag the motion of the target by one time step when the target is receding if the target is detected with increasing range from the receiver. This effect can be compensated for, since the motion of the lagging waveform will follow the motion of the actual waveform, and so the derived estimates of velocity and acceleration can be used to compensate for the lag. Alternatively, the time step can be chosen sufficiently short that the target does not move a significant distance in a single time step.

It will be understood that this second embodiment is particularly efficient at tracking a moving target because the difference waveform is negligibly small unless the target moves. Thus target movement is easily discernible in the difference waveform.

2.5 Precision Target Location

The precision target location techniques described in Section 1.5 in relation to the first preferred embodiment are also applicable to the second preferred embodiment. Correlation detection (see Section 1.5(a)) is particularly useful with the procedure of the second embodiment since it can allow for the difference waveform obtained with this procedure being somewhat distorted for a slowly moving target ("slowly" being defined as the target moving by less than the width of a radiated pulse over the period between measurements (a time step)).

2.6 False Alarm Rejection

The false alarm rejection techniques described in Section 1.6 in relation to the first preferred embodiment are also applicable to the second preferred embodiment. It should be noted that, to optimise reacquisition of the genuine target when the transient target is removed, the genuine target location is stored, but the reference waveform is not updated until movement of the genuine target is again detected.

3. HYBRID TECHNIQUE

A potential difficulty with the clutter subtraction technique described in Section 1 arises if a target such as a walkway, ladder or pipe initially below the surface of the liquid becomes uncovered as the liquid level falls. The clutter subtraction technique might acquire this emerging clutter as the target. The differencing technique of Section 2 would re-acquire the liquid as it fell further whereas the clutter subtraction technique might not. The hybrid technique handles this eventuality.

Thus the third preferred embodiment is a hybrid of the clutter subtraction and difference procedure techniques described in Sections 1 and 2 above. The third embodiment utilises both the potentially greater accuracy of the clutter subtraction technique in the measurement of target displacement and the potentially greater ability of the difference procedure technique to track correctly a moving target.

The apparatus of the third embodiment operates at each instant firstly in the clutter subtraction mode. However, if, at a particular instant, the clutter subtraction mode detects no displacement of the target, then the difference procedure technique is used in addition. If, on the one hand, no target displacement is detected even by the difference procedure technique, then the procedure reverts to the clutter subtraction mode at the next instant, with the clutter waveform, but not the reference waveform, being updated. If, on the other hand, target displacement is detected by the difference procedure technique, then the clutter subtraction mode is utilised at the same instant to compute a more accurate value of target displacement. The procedure then remains in the clutter subtraction mode at the next instant, with both the clutter waveform and the reference waveform being updated.

The techniques described in Sections 1 and 2 above are applicable, as appropriate, to the hybrid technique.

The invention described above relates to the use of a technique for short range electromagnetic sensing. In the architecture of the present invention, high range resolution is used to limit the extent of the clutter together with variable time constant digital filters to allow the detection of targets with very slow motion compared to the measurement rate as well as velocities up to the maximum velocity that can be handled by the measurement rate. The current invention has a major application in liquid level sensing where typically one needs to sense the distance of the liquid interface from a sensor in order to gauge the tank contents. In this case, the clutter environment is the supporting structure for the sensor and the tank containing the liquid. Thus clutter will include multiple reflections between the antennae and reflections from the walls of the tank, walkways or feed pipes within the tank.

A second application is to altimetry, where for instance one wants to maintain a platform (e.g. an aircraft) at a constant height above ground as a landing aid giving precision feedback of height in the last few meters of descent. This is achieved by using the sensor output to feedback the height above ground to the altitude controller.

A third application is to short range intruder detection, where an intruder is detected approaching an area guarded by a sensor. In this case, the moving target will be the intruder and the clutter is nominally static.

It will be understood that the present invention has been described above purely by way of example, and modifications of detail can be made within the scope of the invention.

We claim:

1. A method of detecting the displacement of a target in a given environment, comprising:
storing reference data comprising data representative of the environment;
transmitting a transmit signal towards the target;
sensing the return signals from the target and the environment; and
detecting the displacement of the target by comparing the return signals and the reference data;
the reference data being updated at an update rate which is varied in dependence on the displacement of the target.

2. A method according to claim 1 wherein the return signals are compared only with stored reference data representative of the environment.

3. A method according to claim 2 wherein the transmit signal is transmitted from a transmitter, and data representative of that part of the environment more distant from the transmitter than the target are not stored.

4. A method according to claim 1 wherein the transmit signal is transmitted from a transmitter, and data representative of the parts of the environment both closer to and more distant from the transmitter than the target are stored, but only the data representative of the closer part of the environment are updated, whereby further data are updated as, and whenever, the target recedes from the transmitter.

5. A method according to claim 1 wherein the stored reference data with which the return signals are compared comprise data representative both of the environment and of the target.

6. A method according to claim 5 wherein the reference data are representative of target and environment return signals stored at the same instant.

7. A method according to claim 5 wherein the return signals are compared with reference data representative of the environment, and, if no displacement of the target is detected from this comparison, are additionally compared with reference data representative of the target and the environment.

8. A method according to claim 1 wherein the stored reference data are representative of return signals sensed at at least one previous instant.

9. A method according to claim 1 wherein the transmit signal is transmitted at a plurality of instants, the stored reference data is derived from the return signals and is stored at selected instants, and the displacement of the target is detected by comparing the return signals sensed at one instant and the reference data sensed at at least one previous such selected instant.

10. A method according to claim 1 wherein the stored reference data are only updated if displacement of the target is detected.

11. A method according to claim 1 wherein timing errors in the return signals are detected and compensated for.

12. A method according to claim 1 wherein the relative timing of the reference data and the return signals is compared and compensation is made if any timing error is detected from the comparison.

13. A method according to claim 12 wherein the respective timing of a reference point on the return signal waveform and on the reference data are compared.

14. A method according to claim 12 wherein the respective intervals between two reference points on the return signal waveform and on the reference data are compared.

15. A method according to claim 1 wherein the interval between two reference points on the return signal waveform is compared with a reference value and compensation is made if any timing error is detected from the comparison.

16. A method according to claim 1 wherein the respective amplitudes of a reference point on the return signal waveform and on the reference data are compared.

17. A method according to claim 1 wherein data representative of the environment are determined in the absence of the target.

18. A method according to claim 1 wherein the target is initially identified as the first feature for which a displacement is detected.

19. A method according to any of claim 1 wherein the target is initially identified by the user.

20. A method according to claim 1 wherein data representative of a predetermined portion of the environment adjacent the target are stored, the storage of data being arranged to keep track of movement of the target.

21. A method according to claim 1 wherein the transmit signal has a frequency in the radio-frequency range, the return signals are frequency down-converted to the audio-frequency range, and data processing in the detection step takes place at least partly in the audio-frequency range.

22. A method according to claim 1 wherein the transmit signal is transmitted by a transmitter, and target displacement data produced in the detection step are compensated in dependence on the distance of the target from the transmitter.

23. A method according to claim 1 wherein the target displacement is detected in dependence on a difference waveform derived by comparing the return signals and the stored reference data, and preferably derived by subtracting one of the return signals and the reference data from the other.

24. A method according to claim 23 wherein the target displacement is detected in dependence on the location of an edge of the difference waveform in the region corresponding to the target position.

25. A method according to claim 1 wherein the velocity or acceleration of the target is detected, and an alarm signal is produced if the velocity or acceleration exceeds a predetermined threshold value.

26. A method according to claim 1 wherein an alarm signal is produced if the amplitude or change in the amplitude of a reference point on the return signal waveform exceeds a predetermined threshold value.

27. A method according to any of claim 1 wherein the transmit signal is a broadband pulse, and has a bandwidth greater than 20% of its centre frequency.

28. A method according to claim 27, wherein the transmit pulse is not frequency modulated.

29. A method according to claim 27, wherein the centre frequency of the transmit pulse is less than 5 GHz.

30. A method according to claim 27, wherein the transmit pulse has a frequency in the range of 1 MHz to 1000 GHz.

31. A method according to claim 1, wherein the target is a sample, the environment comprises a container containing the sample, and the method is a method of determining the level of the sample in the container.

32. A method according to claim 31, wherein additionally the transmit pulse is transmitted towards the container and the return signal from the container is sensed.

33. A method according to claim 31, wherein:

the step of transmitting said transmit signal comprises transmitting a broadband, broad-beamwidth, radio-frequency transmit pulse having a beamwidth greater than 20% of its centre frequency towards the sample via the ambient medium naturally present within the container such that the broad beamwidth transmitted radio-frequency energy strikes not only the sample but also other environmental structures internal to the container and at least partly encompassed by said naturally present ambient medium;

the step of sensing said return signals comprises sensing a return broad-beamwidth radio-frequency signal reflected from the sample and from said environmental structures also via said naturally present ambient medium; and the step of detecting said displacement of said target comprises determining the level of said sample from a succession of said sensed broad beamwidth return signals.

34. A method according to claim 33, wherein said determining step includes time-domain comparison of reflected signals sensed at different times.

35. Apparatus for detecting the displacement of a target in a given environment, comprising:

means for storing reference data comprising data representative of the environment;

means for transmitting a transmit signal towards the target;

means for sensing the return signals from the target and the environment; and means for detecting the displacement of the target by comparing the return signals and the stored reference data;

the storage means being adapted to update the reference data at an update rate which is varied in dependence on the displacement of the target.

36. Apparatus according to claim 35 wherein the detection means is adapted to compare the return signals only with stored reference data representative of the environment.

37. Apparatus according to claim 36 wherein the storage means is arranged not to store data representative of that part of the environment more distant from the transmitting means than the target.

38. Apparatus according to claim 35 wherein the storage means is adapted to store data representative of the parts of the environment both closer to and more distant from the transmitting means than the target, but only to update the data representative of the closer part of the environment, whereby further data are updated as, and whenever, the target recedes from the transmitting means.

39. Apparatus according to claim 35 wherein the storage means is adapted to store data representative both of the environment and of the target and the detection means is adapted to compare such data with the return signals.

40. Apparatus according to claim 39 wherein the detection means is adapted to compare the return signals with reference data representative of the environment, and, if no displacement of the target is detected from this comparison, additionally to compare the return signals with reference data representative of the target and the environment.

41. Apparatus according to any of claim 35 wherein the storage means is adapted to store reference data representative of return signals sensed by the sensing means at at least one previous instant.

42. Apparatus according to any of claim 35 wherein the transmitting means is adapted to transmit the transmit signal at a plurality of instants, the storage means is adapted to derive the reference data from the return signals and stored such data at selected instants, and the detecting means is adapted to detect the displacement of the target by comparing the return signals sensed at one instant and the reference data sensed at at least one previous such selected instant.

43. Apparatus according to any of claim 35 wherein the storage means is adapted to update the stored reference data only if displacement of the target is detected.

44. Apparatus according to any of claim 35 including means for comparing the relative timing of the reference data and the return signals and for making compensation if any timing error is detected from the comparison.

45. Apparatus according to any of claim 35 including means for comparing the respective amplitudes of a reference point on the return signal waveform and on the reference data.

46. Apparatus according to any of claim 35 wherein the detection means is adapted to identify the target initially as the first feature for which the detection means detects a displacement.

47. Apparatus according to any of claim 35 wherein the storage means is adapted to store data representative of a predetermined portion of the environment adjacent the target, and is adapted to keep track of movement of the target.

48. Apparatus according to any of claim 35 including means for compensating target displacement data produced by the detection means in dependence on the distance of the target from the transmitting means.

49. Apparatus according to any of claim 35 wherein the detection means is adapted to derive a difference waveform by comparing the return signals and the stored reference data, and to detect the target displacement in dependence on the difference waveform.

50. Apparatus according to any of claim 35 wherein the detecting means is adapted to detect the velocity or acceleration of the target, and means is provided for producing an alarm signal if the velocity or acceleration exceeds a predetermined threshold value.

51. Apparatus according to claim 35, wherein the transmit signal is a broadband radio frequency pulse having a bandwidth of greater than 20% of its centre frequency.

52. Apparatus according to claim 51, wherein the transmit pulse is not frequency modulated.

53. Apparatus according to claim 51, wherein the centre frequency of the pulse is less than 5 GHz.

54. Apparatus according to claim 51, wherein the transmit pulse has a frequency in the range of 1 MHz to 100 GHz.

55. Apparatus according to claim 35, wherein the apparatus is adapted to determine the level of a sample in a container.

56. Apparatus according to claim 55 wherein:

the means for transmitting said transmit signal is adapted to transmit a broadband broad beamwidth radio-frequency transmit pulse having a bandwidth greater than 20% of its centre frequency towards the sample via the ambient medium naturally present within the container such that the broad beamwidth transmitted radio-frequency energy strikes not only the sample but also other environmental structures internal to the container and at least partly encompassed by said naturally present ambient medium;

the means for sensing the return signals is adapted to sense a return broad-beamwidth radio-frequency signal reflected from the sample and from the environmental structures also via the naturally present ambient medium; and the detecting means for detecting the displacement of the target is adapted to determine the level of the sample from a succession of said sensed broad beamwidth return signals.

57. Apparatus according to claim 56, wherein the means for detecting the level of the sample comprises means for effecting a time-domain comparison of reflected signals sensed at different times.

* * * * *